United States Patent
Johnson et al.

(10) Patent No.: US 6,819,754 B1
(45) Date of Patent: Nov. 16, 2004

(54) GENERATION OF COMMUNICATION SYSTEM CONTROL SCRIPTS

(75) Inventors: Lawrence Johnson, Sudbury, MA (US); Alberto Velella, Waltham, MA (US); James P. Twitchell, Chelmsford, MA (US)

(73) Assignee: Cisco Technology, Inc., San Jose, CA (US)

( * ) Notice: Subject to any disclaimer, the term of this patent is extended or adjusted under 35 U.S.C. 154(b) by 844 days.

(21) Appl. No.: 09/650,384

(22) Filed: Aug. 29, 2000

(51) Int. Cl.[7] ............................................. H04M 3/00
(52) U.S. Cl. ........................ 379/265.02; 714/4; 714/15; 700/99; 700/121
(58) Field of Search ...................... 714/4, 15; 700/99, 700/121; 379/265.02

(56) References Cited

U.S. PATENT DOCUMENTS

| | | | |
|---|---|---|---|
| 4,348,554 A | 9/1982 | Asmuth | 179/112.09 |
| 4,696,028 A | 9/1987 | Morganstein et al. | 379/88.24 |
| 4,737,983 A | 4/1988 | Frauenthal et al. | 379/266.08 |
| 4,757,267 A | 7/1988 | Riskin | 379/114.24 |
| 4,788,718 A | 11/1988 | McNabb et al. | 379/112.08 |
| 5,014,208 A * | 5/1991 | Wolfson | 700/99 |
| 5,036,535 A | 7/1991 | Gechter et al. | 379/265.11 |
| 5,109,404 A | 4/1992 | Katz et al. | 379/88.25 |
| 5,164,983 A | 11/1992 | Brown et al. | 379/265.03 |
| 5,226,075 A | 7/1993 | Funk et al. | 379/243 |
| 5,271,058 A | 12/1993 | Andrews et al. | 379/265.11 |
| 5,282,244 A | 1/1994 | Fuller et al. | 379/230 |
| 5,291,550 A | 3/1994 | Levy et al. | 379/242 |
| 5,291,552 A | 3/1994 | Kerrigan et al. | 379/266.04 |
| 5,299,259 A | 3/1994 | Otto | 379/266.04 |
| 5,309,513 A | 5/1994 | Rose | 379/265.12 |
| 5,333,133 A | 7/1994 | Andrews et al. | 370/261 |
| 5,333,188 A | 7/1994 | Bogart et al. | 379/221.14 |
| 5,333,308 A | 7/1994 | Ananthanpillai | 714/4 |
| 5,442,691 A | 8/1995 | Price et al. | 379/220.01 |
| 5,465,286 A | 11/1995 | Clare et al. | 379/32.04 |
| 5,528,678 A | 6/1996 | Kaplan | 379/265.11 |
| 5,530,744 A | 6/1996 | Charalambous et al. | 379/266.08 |
| 5,537,470 A | 7/1996 | Lee | 379/265.11 |
| 5,537,611 A | 7/1996 | Rajagopal et al. | 379/221.07 |
| 5,546,452 A | 8/1996 | Andrews et al. | 379/219 |
| 5,546,456 A | 8/1996 | Vilsoet et al. | 379/266.08 |
| 5,555,297 A | 9/1996 | Ochy et al. | 379/265.03 |
| 5,557,668 A | 9/1996 | Brady | 379/212.01 |
| 5,563,940 A | 10/1996 | Tsuzuki et al. | 379/233 |
| 5,568,544 A | 10/1996 | Keeler et al. | 379/273 |
| 5,577,105 A | 11/1996 | Baum et al. | 379/93.05 |
| 5,586,177 A | 12/1996 | Farris et al. | 379/230 |
| 5,590,188 A | 12/1996 | Crockett | 379/265.02 |
| 5,592,477 A | 1/1997 | Farris et al. | 370/396 |
| 5,633,924 A | 5/1997 | Kaish et al. | 379/266.03 |
| 5,715,306 A | 2/1998 | Sunderman et al. | 379/265.02 |
| 5,787,163 A | 7/1998 | Taylor et al. | 379/266.08 |
| 5,848,143 A | 12/1998 | Andrews et al. | 379/265.09 |
| 5,873,130 A | 2/1999 | Lafferty | 2/16 |
| 5,878,130 A | 3/1999 | Andrews et al. | 379/265.09 |
| 6,490,690 B1 * | 12/2002 | Gusler et al. | 714/4 |

* cited by examiner

Primary Examiner—Ahmad F. Matar
Assistant Examiner—Karen Le
(74) Attorney, Agent, or Firm—Cesari and McKenna, LLP (57) ABSTRACT

Techniques are provided for use in generating call routing control scripts. The techniques permit call routing control scripts, initially generated for use in controlling a first communication system, to be adapted for use in controlling a second, different communication system. More specifically, in these techniques, values (e.g., numerical values) used to identify script-controlled objects (i.e., physical or logical entities in the first system) in the initially-generated script, are replaced with values identifying equivalent objects in the second system, to thereby facilitate creation of another script that is executable by the second system. The initially-generated script contains a section in which the object identification values used in the initially-generated script are grouped together, in association with respective logical handles/names and respective object classifications of the objects that they identify, in order to facilitate determination of the equivalent objects.

28 Claims, 8 Drawing Sheets

GENERATION OF COMMUNICATION SYSTEM CONTROL SCRIPTS

BACKGROUND OF THE INVENTION

1. Field of the Invention

The present invention relates generally to techniques for use in generating a control script that when executed controls a communication system, and more specifically, to such techniques wherein a script that was initially created for use in controlling a first communication system may be converted for use in controlling a second communication system. Although the present invention will be described in connection with scripts that may be executed to control routing of calls in communication systems, it should be understood from the outset that the techniques of the present invention may also be used to advantage in connection with other types of communication system control scripts, including scripts that are primarily or exclusively for use in controlling non-call-routing related functions/operations (e.g., administrative functions/operations).

2. Brief Description of Related Prior Art

Systems for routing calls through public and/or private communications networks are known in the art. Conventional automatic call distribution (ACD) systems route calls to agents in telemarketing and service inquiry centers, and provide limited real-time call management and reporting capabilities. A typical ACD system will monitor the status of the agent and, when an incoming call is received, selects the agent to handle a particular service request. Reporting and performance data from the agents are also generated by the ACD.

One particular type of scheme for distributing calls to agents is disclosed in Frauenthal et al., U.S. Pat. No. 4,737,983. According to Frauenthal et al., data representing the present call congestion of each of the ACD systems is accumulated in a database. Using the data in the database, the percentage of calls made to the ACD systems, as a group, is determined. The information is then used to generate call routing information. When a new call is made to the central office, the routing information is queried to determine which of the ACD systems is to receive the call, so as to balance the call traffic load across the ACD systems.

Another call distribution scheme is provided in Gechter et al., U.S. Pat. No. 5,036,535. This patent discloses a system for automatically distributing telephone calls placed over a network to one of a plurality of agent stations connected to the network via service interfaces, and providing status messages to the network. Gechter et al.'s disclosed system includes means for receiving the agent status messages and call arrival messages from the network, which means are connected via a network service interface to the network. Routing means responsive to the receiving means is provided for generating a routing signal provided to the network to connect the incoming call to an agent station through the network. In the system disclosed in Gechter et al., when an incoming call is made to the call router, it decides which agent station should receive the call, establishes a call with that agent station, and then transfers the original call onto the second call to connect the incoming caller directly to the agent station and then drops out of the connection (See, Gechter et al., column 11, lines 45–51).

Other prior art call routing and distribution techniques are disclosed in Andrews et al., U.S. Pat. No. 5,873,130, which is assigned to the assignee of the subject application. This patent discloses a communications system and method for automatically making telephone routing decisions with global authority based upon information gathered in real time from the entire communications system and global optimization criteria. The entirety of the disclosure of the Andrews et al. patent is incorporated herein by reference.

In conventional call processing systems, calls may be routed in accordance with call routing control scripts executed by the system. The scripts include instructions that, when executed by the system, control physical and/or logical entities (e.g., agent systems, agent workgroups, ACD systems, and/or interactive voice response units ("IVRs")) comprised in the system so as to cause the calls to be routed to desired destinations, and also cause non-call-routing-related functions/operations (e.g., administrative functions/operations) to be performed in the system. Hereinafter, these physical and/or logical entities controlled by the scripts are referred to as "objects." These script instructions reference the objects that they control, using respective unique object identification numbers arbitrarily assigned to them by the system, and explicitly recited in the instructions. That is, the object identification numbers are expressed in the scripts as specific constant numerical values.

If two communication systems have similar objects and configurations, it would be desirable to adapt control scripts, developed for use in controlling one of the communication systems (hereinafter termed "the originating system"), for use in controlling the other communication system (hereinafter termed "the target system"). Heretofore, such script adaption has been difficult, since typically, the object identification numbers referenced in the script developed for control of the originating system will almost never be the same as those assigned to similar objects in the target system, and such script adaption has required, e.g., line-by-line searching and replacement of code in the scripts (i.e., to appropriately change the referenced object identification numbers). As a result, in such script adaptation, a significant burden may be placed upon script programmers in terms of script coding and debugging time, effort, and frustration.

Accordingly, it would be desirable to provide techniques that both facilitate the ability to adapt scripts developed for controlling an originating system, so that they can be used in controlling a target system, and do not place such a significant burden upon script programmers.

SUMMARY OF THE INVENTION

In accordance with the present invention, techniques are provided that overcome the aforesaid and other disadvantages of the prior art. In one embodiment of a technique according to the present invention, a call routing control script is generated that includes a first section and a second section. The first section contains call routing instructions that reference values (e.g., numerical values) that identify respective objects in an originating communication system. The respective objects may comprise one or more physical and/or logical entities (e.g., agent workgroup, agent, ACD, and/or IVR systems) in the originating system, and the script may contain at least one instruction that, when executed by the originating system controls the one or more entities. In the second section of the script, the object identification values are associated with respective logical handles/names and with respective types/classifications of the respective objects identified by the respective object identification values. A database table may be stored (e.g., in the originating communication system) that correlates the respective object identification values with the respective logical handles and with the respective object classifications of the respective objects with which they are associated.

In an embodiment of another technique according to the present invention, a first control script that is executable by a target communication system is generated from a second control script developed for use in controlling an originating communication system. In order to generate the first script, a first section of the second control script is accessed to locate therein instructions that reference object identification values that identify objects in the originating communication system. These objects include one or more physical and/or logical entities (e.g., agent workgroup, agent, ACD, and/or IVR systems) in the originating communication system that are controllable by execution of one or more instructions in the first section of the second script. The second script also contains a second section that is inserted into the second script prior to its being used to generate the first script, and in which the object identification values are associated with respective logical handles/names and with respective classifications/types of the objects identified by the respective values. A database table is provided in the target system that correlates respective object identification values of respective objects in the target system with respective logical handles/names and with respective classifications/types of the respective objects in the target communication system. Based upon information contained in, and obtained from the database and second section of the second script, at least certain object identification values of objects in the originating communication system that correspond to objects in the target communication system are located in the first section of the second script, and are replaced with respective object identification values of corresponding objects (i.e., having the same respective logical handles/names and classifications) in the target communication system.

In this embodiment of this technique of the present invention, a user may be prompted (e.g., via a graphical user interface) to supply additional object identification values if the number of object identification values replaced in the first section of the second script is less than the total number of object identification values referenced by instructions in first section of the second script. An object in the originating system may be classified as "corresponding" or "equivalent" to an object in the target system, if the respective logical handles/names and classifications of the objects are identical.

Thus, by including in a control script developed for use in controlling an originating system, a section in which the object identification values referenced by the script's instructions are associated with respective logical handles/names and respective classifications/types of the objects identified by the values, determination of equivalent/corresponding objects in a target system may be facilitated (e.g., by comparing respective logical handles/names and object classifications/types recited in that section with respective logical handles/names and respective object classifications of objects of the target system). After these equivalent/corresponding objects have been determined, it becomes relatively easy (e.g., using computerized editing techniques) to replace the respective object identification values in the script, with the respective object identification values of the respective corresponding objects in the target system, to the extent that such corresponding objects exist in the target system. Thus, advantageously, the present invention greatly facilitates the adaptation of scripts developed for use in controlling an originating communication system so that they may be used in controlling a target communication system, and substantially reduces, compared to the prior art, the burden that is placed upon script programmers in adapting such scripts.

BRIEF DESCRIPTION OF THE DRAWINGS

Other features and advantages of the present invention will become apparent as the following Detailed Description proceeds, and upon reference to the Drawings, wherein like numerals depict like parts, and wherein.

It will be appreciated by those skilled in the art that although the following Detailed Description will proceed with reference being made to illustrative embodiments and methods of use, the present invention is not intended to be limited to these embodiments and methods of use. Rather, the present invention is of broad scope and is intended to be defined only set forth in the accompanying claims.

DETAILED DESCRIPTION OF ILLUSTRATIVE EMBODIMENTS

Figure 1:
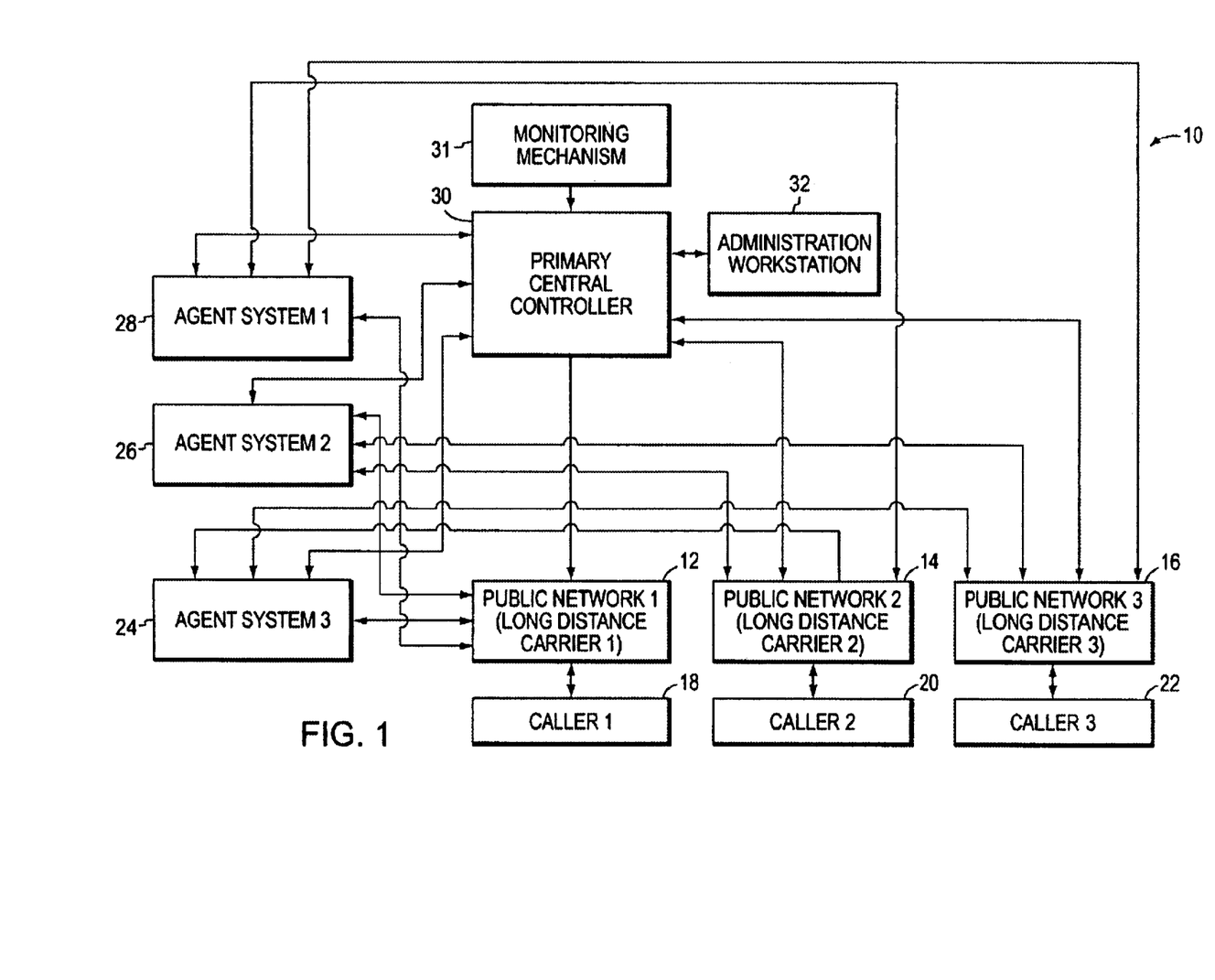
FIG. 1 is a functional block diagram of one embodiment of a communication system wherein techniques of the present invention may be practiced to advantage.

FIG. 1 is an architectural-level block diagram illustrating functional components of a communications system 10 wherein embodiments of the technique of the present invention may be advantageously practiced. System 10 includes a plurality of agent systems 24, 26, 28 connected to a primary central controller 30 and a plurality of conventional public telephone and/or long distance carrier networks (e.g., MCI, Sprint, AT&T) 12, 14, 16. Callers 18, 20, 22 place calls to the agent systems 24, 26, 28 via public networks 12, 14, 16. As will be explained more fully below, primary central controller 30 generates control signals for controlling routing and distribution of calls through the long distance carriers to and from the agent systems, and through the agent systems themselves to and from individual workgroups, customer agents and/or caller services, based upon requested service data (e.g., telephone numbers and other information) supplied by callers through the public networks, status messages (i.e., describing availability of resources for use by callers, loading of system resources, etc.) supplied by the agent systems, and call routing control scripts stored in controller 30. Administration workstation 32 permits user access and control of the system 10 by, for example, permitting generation and modification of system configuration data, call routing scripts, etc. stored in controller 30. Monitoring and diagnostic mechanism 31 monitors the various elements of the system (i.e., the agent systems 24, 26, 28, administration means 32, etc.) to determine whether these elements are functioning properly. If a malfunction is detected, that fact is signaled to the central controller 30, so that it can undertake appropriate action to correct and/or eliminate the malfunction and/or any resulting problems to the system 10 from the malfunction.

Although not shown in the Figures, each of the conventional long distance carriers 12, 14, 16 includes a long distance control network (e.g., AT&T's Signaling System 7 (SS7) control network, MCI's TCP/IP-based control network, Sprint's X.25-based control network and/or foreign telecommunication's CCITT SS7-based control network) and local exchange carriers. The long distance control networks control routing of calls through the long distance network serviced by the exchange carriers. When a long distance call request is received (e.g., a caller dials a long distance telephone number) by the exchange carrier, it forwards the call to the long distance network, which routes the call to its intended destination. In system 10, when the long distance control network receives a request for long distance connection to one of the agent systems 24, 26, 28 (or, as will be explained more fully below, to one of the agent systems' workgroups or caller services), the long distance control network forwards the long distance routing request to the central controller 30. As will be described more fully below, central controller then processes the request and controls the system 10 to route the call to a destination in accordance with call routing control scripts executed by the controller 30. The system 10 accomplishes call routing by, inter alia, translating the routing request message into a route response message for addressing the desired destination. System 10 also supports routing of calls across local exchange carriers and international PTT's by utilizing substantially the same call control and distribution techniques discussed above.

Figure 2:
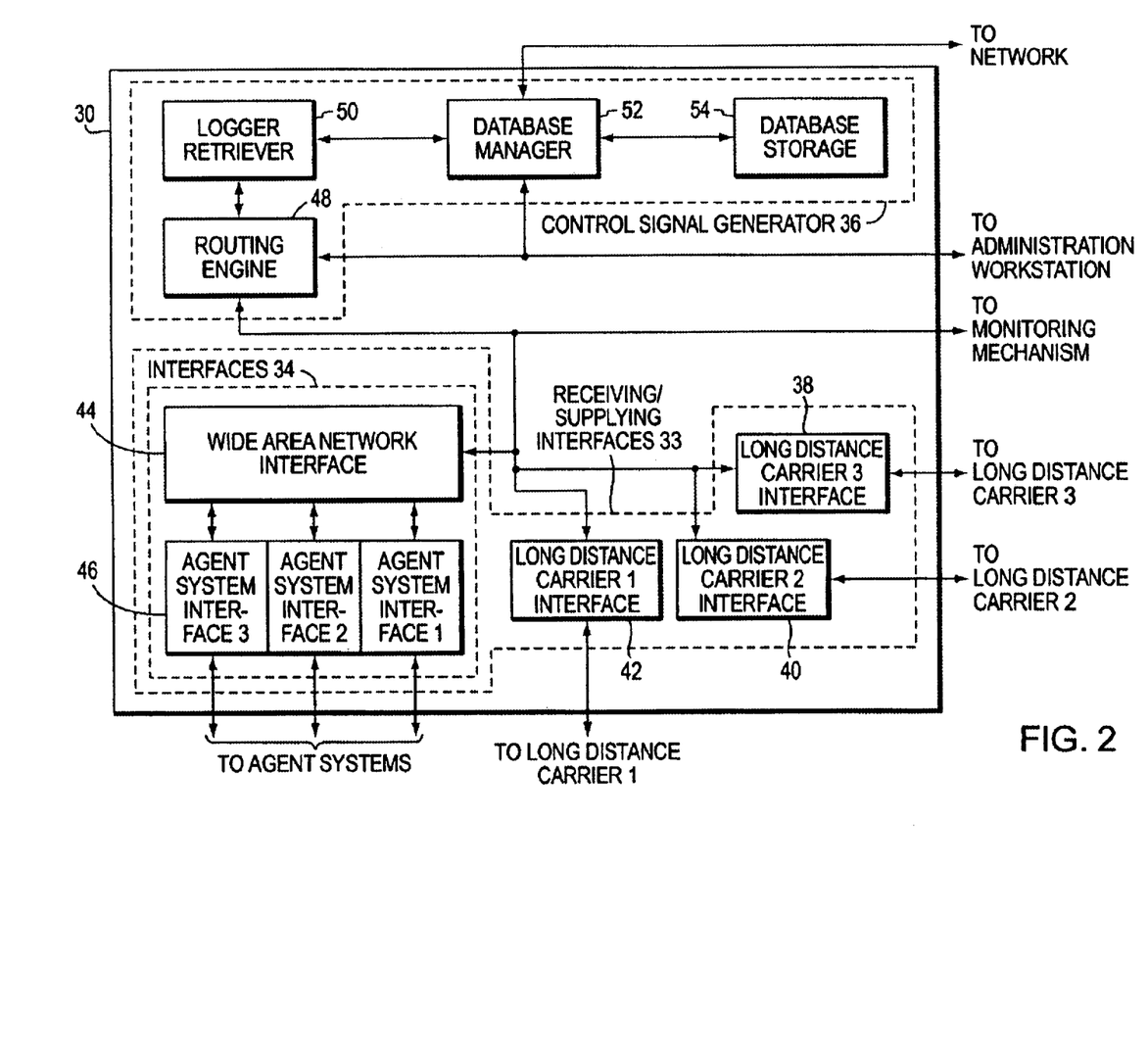
FIG. 2 is a functional block diagram of the primary central controller of the system of FIG. 1.

FIG. 2 is a schematic block diagram illustrating functional components of the central controller 30. Controller 30 includes interfaces 33 for receiving status messages and caller service requests, and for supplying control signals generating by the controller 30 to the public networks and the agent systems. Interfaces 33 include long distance carrier interfaces 38, 40, 42 for interfacing the controller 30 to the public networks 12, 14, 16, respectively. Each of the interfaces 38, 40, 42 is appropriately constructed to permit transmission of control signals and receipt of caller service requests from the respective network to which it is connected. For example, if carrier interface 42 is connected to an AT&T network, then it is appropriately constructed to permit transfer of control signals and service requests between the controller 30 and the SS7 network. Other types of carriers must also be similarly accommodated by appropriately constructing the other interfaces 40, 38 to permit exchange of such data between these networks and the controller 30.

Interfaces 33 also include agent gateways (i.e., interfaces) 34 for interfacing the controller 30 to the agent systems 24, 26, 28. Interfaces 34 include agent systems interfaces 46 connected to a conventional wide area network 44. Wide area network 44 connects the controller 30 to the interfaces 34 so as to permit transmission of status messages from the agent systems to the controller 30, and to permit transmission of control signals to the agent systems 24, 26, 28. It should be understood that the particular types of interfaces 46 used will depend upon the particular constructions of the agent systems, the wide area network, and the controller. Wide area network 44 may be a conventional TCP/IP (Transmission Control Protocol/Internet Protocol) network, although alternatively, network 44 may be constructed to use other types of network protocols.

Figure 5:
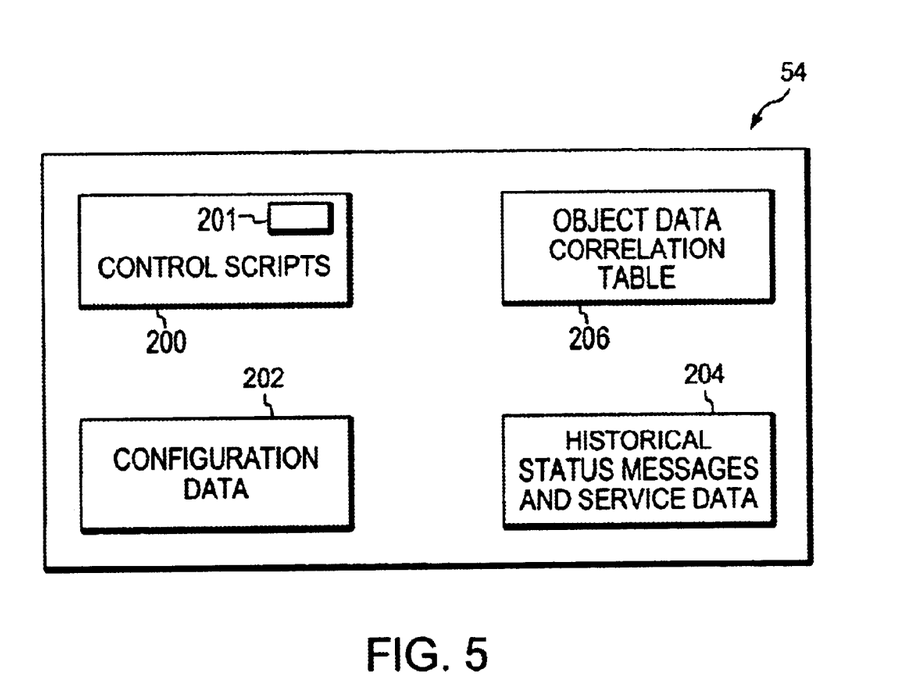
FIG. 5 is a schematic block diagram illustrating data structures in the database shown in FIG. 2.

Control signal generator 36 is connected to the interfaces 33, monitoring mechanism 31, and administrative workstation 32. Control signal generator 36 comprises routing engine 48, database logger/retrieving engine 50, database manager 52, and database 54. Routing engine 48 determines how to route calls in the system 10 (i.e., through the public networks to the agent systems, and in the agent systems themselves), and transmits this routing information (in the form of appropriate control signals, such as routing response messages) for addressing the desired end-termination (e.g., a workgroup/caller service system in the system) to interfaces 33, 34 for transmission to the agent systems and long distance control networks, respectively. In order to determine how to route calls in the system, routing engine 48 takes into consideration real-time requested service data supplied to it by the interfaces 33, system configuration data 202 and historical (i.e., previously stored) requested service data and status messages 204 retrieved by logger/retriever 50 at the command of the routing engine 48 from the system's historical database (comprising database manager 52 and database storage mechanism 54), real-time status messages from the agent systems supplied to it from the interfaces 34, information from the monitoring mechanism 31 concerning what components (if any) of the system are currently unavailable because they are malfunctioning or inoperative, and routing optimization criteria and/or rules and commands in the form of call routing control scripts 200 stored in database 54 (see FIG. 5). Some or all of such scripts 200 may be initially generated by the administration workstation and stored in database 54, or alternatively, may be converted from other scripts that were originally intended to be executed by other communication systems, in accordance with present invention. Routing engine 48 executes the scripts using this data to determine the manner in which to route calls in the system. After making its decision on how best to route a particular call, generating appropriate control signals to implement this decision, and transmitting the control signals to the interfaces 33 and 34, routing engine 48 instructs logging engine 50 to store the real-time information presented above in the database 54 for use in determining how to route later calls. Logging engine 50 in turn, commands database manager 50 to store this information in database 54. Scripts 200 may comprise corporate and/or customer-generated call routing scripts.

Figure 3:
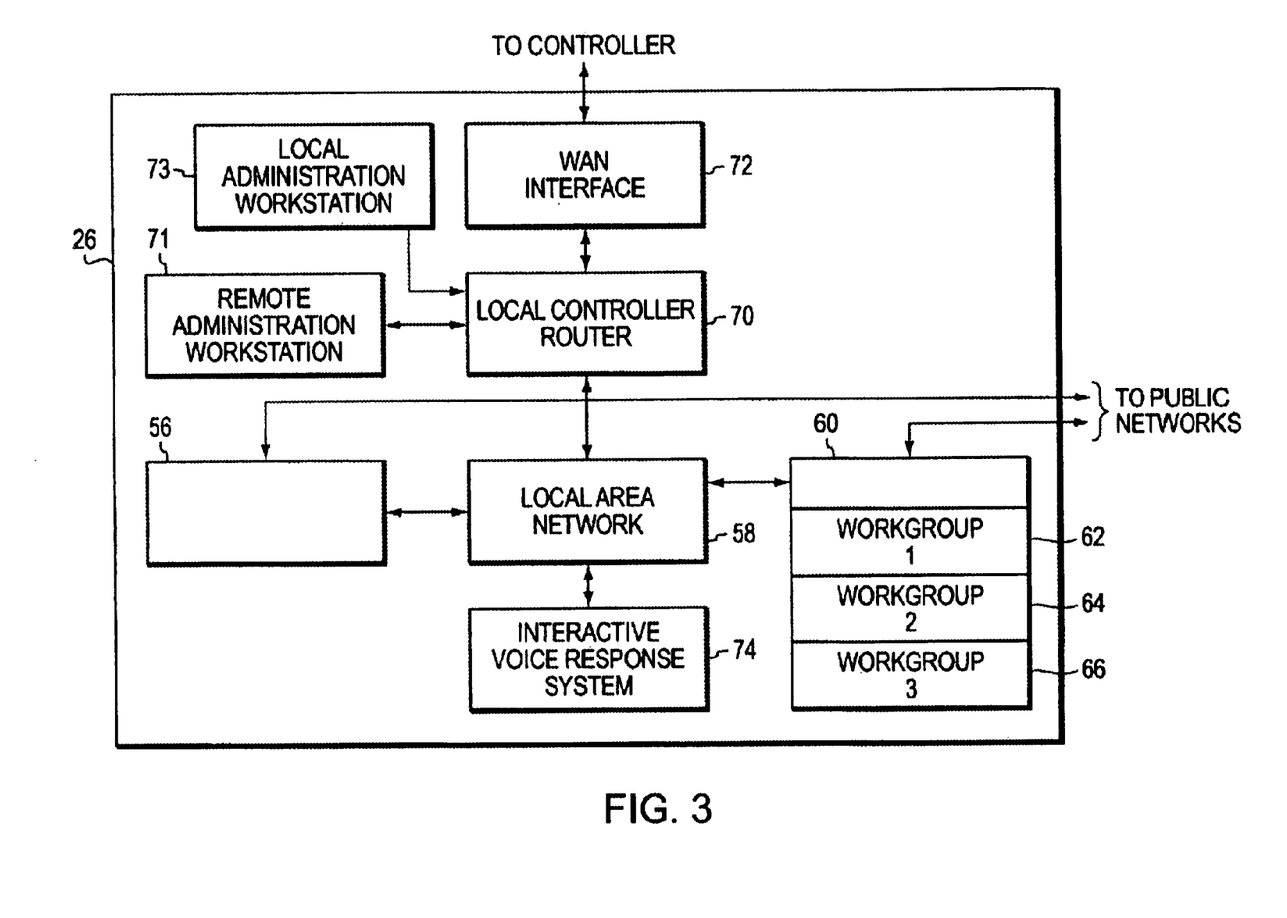
FIG. 3 is a functional block diagram of an agent system in the system of FIG. 1.

FIG. 3 is a functional block diagram of an agent system 26. Agent system 26 may comprise wide area network interface 72 for interfacing the agent system's local controller/router 70 to the controller's wide area network 44, so as to permit transfer of control signals from controller 30 to local controller 70 and status message from the local controller 70 to controller 30. In response to control signals received by local router 70 from controller 30, local router 70 issues commands to the ACD/IVR, or PBX system causing public network interfaces (not shown) in the ACD, PBX or IVR to connect calls received thereat from the public networks to appropriate caller services (e.g. interactive voice response system 74) or individual agents (e.g. private branch exchange (PBX) 56 or ACD 60). It should be noted that the particular type and number of caller services and individual agents shown in FIG. 3 are merely for illustrative purposes and may vary. Local router 70 issues commands via the conventional local network 58 to the caller service or individual agent system to which the call is connected, as to how the individual agent or caller service is to distribute or process the call. For example, depending upon the control signals transmitted by the controller 30 to controller 70, controller 70 may instruct the call to be forwarded directly to the interactive voice response system 74 which is connected as an answering resource to ACD 60, and instruct the interactive voice response system to store information from the call for later retrieval and transmission to a workstation (not shown) connected to the PBX 56, or to connect the call to the ACD 60 and instruct the ACD to forward the call to one of its workgroups 62, 64, 66. Of course, it will be appreciated that if appropriately modified, the network interfaces may be comprised within the public networks or may comprise a separate, stand-alone interfaces distinct from the agent systems. Likewise, if the PBX, IVR, and/or ACD are appropriately modified so as to include other of the various functional components of the agents (e.g. router 70), they may be eliminated, or comprised as separate functional components from the agent system.

Local controller 70 also queries the individual agents and caller services for status information (e.g. whether they are active or busy, what resources are available for use by callers, etc.), gathers this status information via the local network 58, and transmits this information to the central controller 30 via interface 72 for use in the central controller's routing decisions. In this way, the central controller 30 may automatically control routing of calls not only through the public networks, but also in the agent systems, according to status information gathered from the entire system, using the call routing scripts and global call distribution criteria.

Agent system 26 may also comprise local administration workstation 73 for permitting user control of the local router 70, and remote administration workstation 71 for permitting remote control of central controller 30. Both administration workstations 73, 71 are of similar construction to administration workstation 32. Local administration workstation 73 may be limited in its ability to control local router 70 (i.e., only to control matters not being controlled by central controller 30). Likewise, remote administration workstation 71 may be limited in its authority over system 10 such that administration workstation 32 may override commands issued by administration workstation 71.

Figure 4:
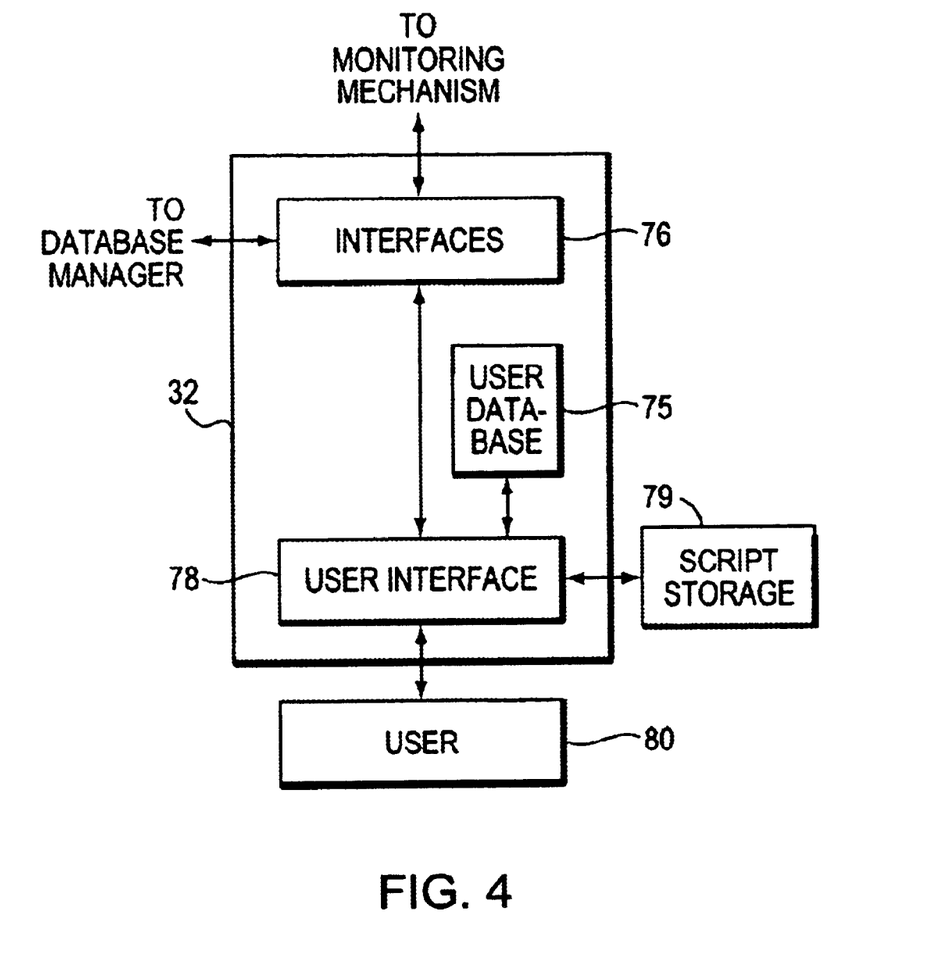
FIG. 4 is a functional block diagram of an administrative workstation in the system of FIG. 1.

FIG. 4 is a functional block diagram of administration workstation 32. Workstation 32 may comprise a user input/output interface 78 connected to central controller interface 76. As will be described more fully below, user interface and script generator/editor 78 may comprise a graphical user interface for permitting a human user 80 to generate, edit, and store call control routing scripts 200, system configuration data 202, object data correlation table 206, etc. in the database 54 of the central controller 30. The database interface 76 is adapted to change the user's graphically input data into a form usable by the central controller 30 in the central controller's database 54. Administration workstation 32 comprises a user-accessible database 75 for storing real-time information and configuration information and for permitting such information to be communicated to a human user via the user interface 78. Also, administration workstation 32 permits a user to monitor various system activities and current system information, such as, call routing, system configuration, etc.

The above-presented functional components (with the exception of networks 12, 14, and 16) of system 10 may be embodied as one or more distributed computer program processes executing in a plurality of computer nodes; each of these nodes may include computer-readable memory for storing software programs, algorithms, and data structures associated with, and for carrying out, the inventive techniques, and related and other techniques and methods described herein as being carried out by or implemented in system 10. In addition, each of these nodes may further include a processor (e.g., an Intel 80×86 processor) for executing these software programs and algorithms, and for manipulating the stored data structures, to enable the nodes to carry out these methods and techniques in system 10. Additionally, the nodes may be provisioned with such networking hardware and software (e.g., including computer networking and telephonic communications hardware and software) as is needed to enable performance of the stated functionality.

It should be noted that the functional components of the system 10 may vary depending upon particular functional and operational requirements. For example, the existing components of system 10 may be modified to incorporate the functionality of, or the system 10 may be modified to include, fault-tolerance-related functional components (e.g., a redundant central controller), components related to processing of Internet calls, and/or call-queuing-related components described in the aforesaid Andrews et al. patent (i.e., U.S. Pat. No. 5,873,130). Accordingly, it should be appreciated that the present invention may be practiced in systems other than system 10 (e.g., in systems having different and/or additional functional components like those described in the aforesaid Andrews et al. patent, and other communications systems).

With reference now being specifically made to FIGS. 5–8, illustrative embodiments of the techniques of the present invention will be described. In accordance with embodiments of the techniques of the present invention, the central controller 30 assigns to each of the objects (logical or physical entities, e.g., including agent systems 24, 26, 28, and portions thereof, such as the IVR systems 74, ACDs 60, PBXs 56, and workgroups 62, 64, 66 comprised in agents systems 24, 26, 28) that can be controlled by execution of one or more instructions in control scripts 200 a respective unique logical handle/name, respective unique object identification number, and respective object classification number, based upon user commands provided to the controller 30 by the interface 78. These object classification numbers identify the objects as belonging to specific classifications or types of objects in the system 10 based upon similar properties, operations, and/or functionalities of the objects. That is, each of the objects in system 10 that is controllable by execution of one or more control script instructions is logically grouped together with other objects in system 10 that have similar properties, operations, and/or functionalities, and each of the resulting subsets of respectively similar objects is assigned a respective object classification number. The respective object identification number, assigned to a respective subset of respectively similar objects, is also assigned to the objects that subset. Database 54 of central controller 30 of system 10 stores object data correlation table 206 in which the respective logical handles/names, object identification numbers, and respective object classifications of these respective objects are associated with each other.

Figure 8:
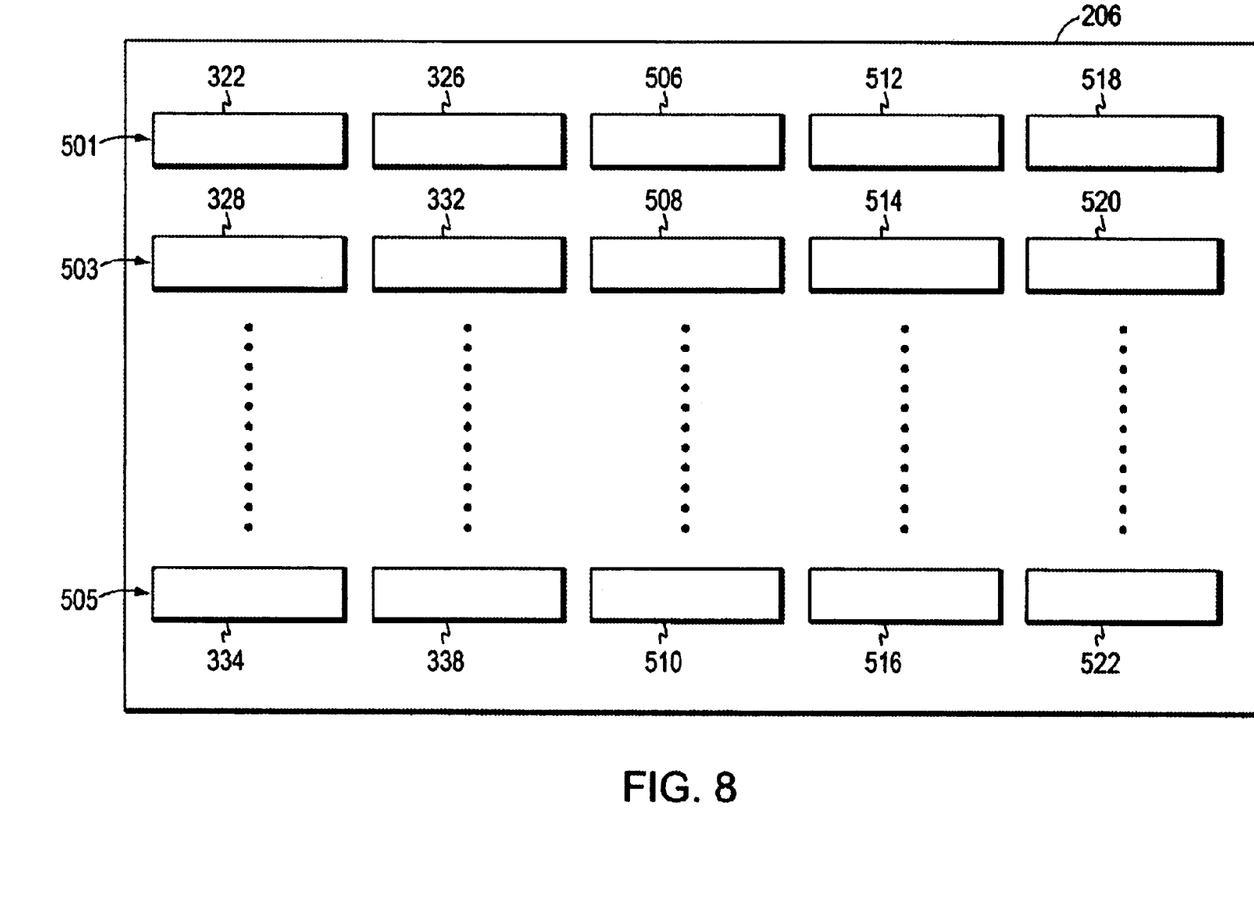
FIG. 8 is a schematic diagram illustrating structure and contents of the database table shown in FIG. 5.

For example, assuming for purposes of illustration that controller 30 assigns to agent system objects 28, 26, 24 the logical handles 322, 328, and 334, respectively, the object classification numbers 326, 332, and 338, respectively, and the object identification numbers 506, 508, and 510, respectively. The database manager 52 stores and maintains in database 54 object data correlation table 206 that contains associative tuples 501, 503, 505; in each of the tuples 501, 503, 505, the respective handle, object classification number, and object identification number of a respective object are associated with each other. For example, in tuple 501, logical handle 322 of agent system 28 is associated with the object classification and identification numbers 326 and 506, respectively, of agent system 28; in tuple 503, logical handle 328 of agent system 26 is associated with the object classification and identification numbers 332 and 508, respectively, of agent system 26; and, in tuple 505, logical handle 334 of agent system 24 is associated with the object classification and identification numbers 338 and 510, respectively, of agent system 24.

Additional information optionally may also be stored in the table 206. For example, each of the tuples 501, 503, 505 may include respective user-understandable written descriptions 512, 514, 516 of the objects 28, 26, 24 themselves, and respective descriptions 518, 520, 522 of the properties of the objects 28, 26, 24.

Figure 7:
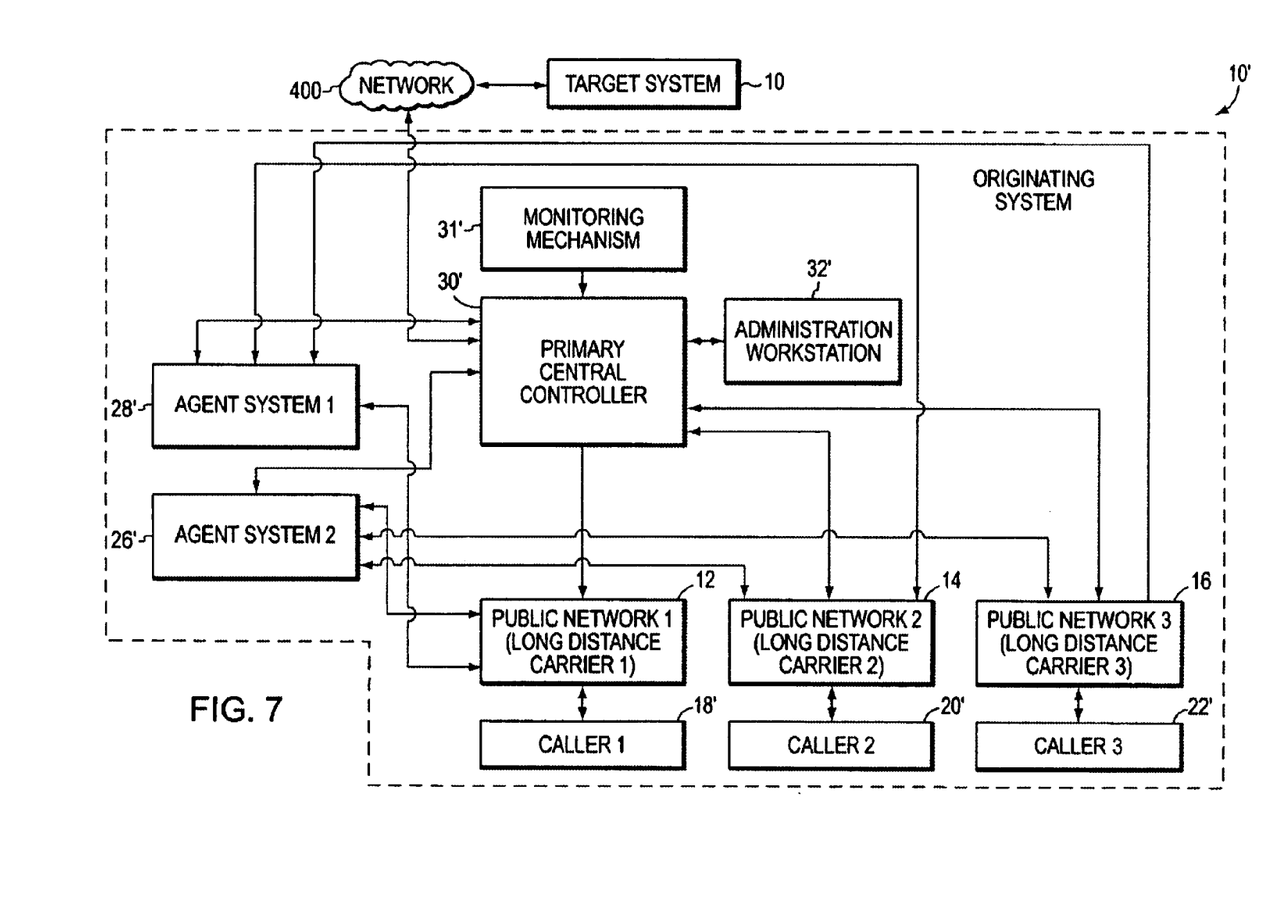
FIG. 7 is a highly schematic diagram illustrating originating and target communication systems, one of which is the system of FIG. 1, for use in facilitating the description of aspects of the present invention.

In accordance with these embodiments of the present invention, scripts 200 may comprise at least one call routing control script 300 that was originally created by another communication system (i.e., an originating communication system) 10' for use in controlling call routing in that system 10', and that may be adapted for use in controlling call routing in target communication system 10. For purposes of illustration, it is assumed that agent systems 28' and 26' of system 10' have substantially the same respective functionalities, configurations, and operations in system 10' as agent systems 28 and 26, respectively, have in system 10; controller 30' has substantially the same functionality, configuration, and operation in system 10' as controller 30 has in system 10; administration workstation 32' and monitoring mechanism 31' have the same respective functionalities, configurations, and operations in system 10' as workstation 32 and monitoring mechanism 31, respectively, have in system 10; and, callers 18', 20', and 22' serve the same respective purposes in system 10' as callers 18, 20, and 22, respectively, in system 10.

Script 300 may be initially generated by the system 10', and stored in the database (not shown) of controller 30'. Thereafter, based upon user commands provided to the controllers 30, 30' by workstations 32, 32', respectively, the script 300 may be transmitted via wide area network 400 (e.g., comprising a conventional TCP/IP Internet computer network) from the database manager (not shown) of controller 30' (after the database manager has first retrieved the script 300 from database storage (not shown) in controller 30') to the database manager 52 of the controller 30. After the manager 52 of controller 30 has received the script 300 from the originating system 10', the manager 52 may cause the script 300 to be stored with the scripts 200 in the database 54 of controller 30.

Alternatively, the user interface (not shown) of workstation 32' and the user interface 78 of the workstation 32 may each comprise a respective conventional mechanism for storing data (such as the script 300) to, and retrieving stored data from, a removable memory medium (e.g., a magnetic floppy or optical disk storage medium) 79. Using the conventional storage mechanism in the user interface of workstation 32', the script 300 may be stored to the script storage medium 79. The medium 79 may then be physically transported to the workstation 32, and retrieved therefrom by the interface 78 and stored in the database 54 by the manager 52.

Figure 6:
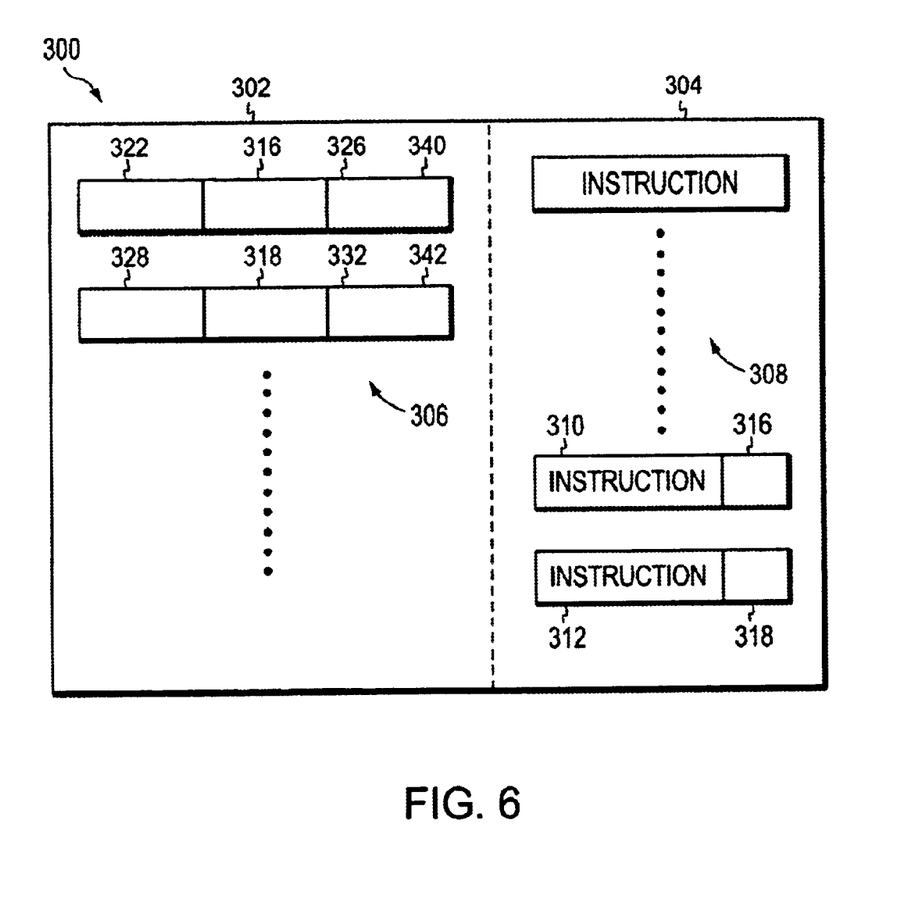
FIG. 6 is a schematic diagram illustrating contents of a control script that may be stored and processed in the system of FIG. 1.

As shown in FIG. 6, as initially generated by the originating system 10' and stored in the target system 10, the script 300 includes two sections: a header section 302 and a main section 304. Section 304 includes a plurality of instructions 308. Instructions 308 of section 304 include instructions 310, 312 that reference object identification numbers 316, 318, respectively. When executed by system 10', these instructions 310, 312 control the objects (e.g., agent systems 28', 26', respectively) in system 10' whose identification numbers 316, 318 are referenced in instructions 310, 312, respectively, so as to facilitate routing of calls in system 10'.

Section 302 of script 300 includes a plurality of associative tuples 306. In each of the tuples 306, a respective object identification number referenced by an instruction in section 304 is associated with the respective logical handle and object classification number of the respective object to which the respective object identification number has been is assigned by the controller 30'. For example, in tuple 340, the respective logical handle 322, respective object identification number 316, and respective object classification number 326, assigned to the agent system 28' by the controller 30', are associated with each other; in tuple 342, the respective logical handle 328, respective object identification number 318, and respective object classification number 332, assigned to the agent system 26' by the controller 30', are associated with each other. The tuples 306, and data values (e.g., values 316, 318, 322, 326, 328, 332) contained in the tuples 306, may each be separated and delimited from each other by predetermined combinations of delimiting characters (e.g., blanks spaces, braces, etc.). It should be appreciated that the sequence order of the data values in each of the tuples 306 is predetermined, however the order may vary depending on the particular implementation. Thus, for example, although in FIG. 6, the order of the data values in each tuple 306 is such that the object handle is followed by the object identification number, which in turn, is followed by the object classification number, this sequence order may vary depending upon the implementation (e.g., the order of the object identification and classification numbers may be reversed in each tuple 306). Additionally, although not shown in FIG. 6 it should be understood that the sections 302, 304 may be delimited from each other by predetermined combinations of delimiting characters (e.g., blank spaces and braces, etc.). The header section 302 may also include in a predetermined location (e.g., at or near the beginning of the section 302) a numerical value that indicates the total number of data values or tuples 306 in section 302 whereby to facilitate later analysis/processing of the script 300.

Additionally, although not shown in the Figures, each of tuples 306 may also include two other respective data structures whose values may separated and delimited from each other by predetermined combinations of delimiting characters. One of these two other data structures may specify, in each respective tuple in section 302, the number of times in instructions 308 that the respective object classification number recited in the respective tuple is referenced (i.e., by the instructions 308); the other such data structure may be a list of values that identify the respective instructions in instructions 308 that reference the respective object identification number in the respective tuple.

The user 80 initiates the adaptation of script 300 (i.e., so that it can be executed by system 10) by issuing appropriate commands to the manager 52 via the user interface and script editor 78. These commands first cause the manager 52 to retrieve the script 300 from the database 54 and to store a local image (i.e., copy) thereof in the user database 75. The commands then cause the interface 78 to search through local image of the script 300 to locate therein instructions (e.g., instructions 310, 312) in section 304 that include references to object identification numbers (e.g., numbers 316, 318) of objects (e.g., agent systems 28', 26') in the originating system 10'. Interface 78 then locates respective tuples (e.g., tuples 340, 342) in section 302 that contain these object identification numbers 316, 318.

After locating the respective tuples 340, 342 in section 302 that contain the respective object identification numbers 316, 318 referenced by the instructions 310, 312 in section 304, the interface 78 retrieves from the respective tuples 340, 342, the respective object handles 322, 328 and object classification numbers 340, 342 associated with these numbers 316, 318. The interface 78 also causes the database manager 52 to access, and to store in the user database 75 a local image of, the information stored in table 206. The interface 78 determines from the information in table 206, and the object handles 322, 328 and object classification numbers 340, 342 retrieved from the tuples 340, 342, whether any of the objects 28', 26' in originating system 10' whose identification numbers 316, 318 are referenced by instructions 310, 312 in script 300 correspond or are equivalent to objects (e.g., agent systems 28, 26) in target system 10.

More specifically, interface 78 makes this determination by comparing the respective object handles and object classification numbers respectively associated in tuples 306 with identification numbers 316, 318, for matches with object handles and object classification numbers in table 206. For example, since the object handle 322 and object classification number 326 in tuple 501 of table 206 match the object handle 322 and object classification number 326, respectively, in tuple 340, the object 28' in the originating system 10' whose identification number 316 (as assigned by system 10') is associated with the handle 322 and classification number 326 in tuple 340, is considered by interface 78 to correspond or be equivalent to the object 28 in target system 10 (i.e., whose handle 322 and classification number 326 as assigned by system 10 are stated in tuple 501). Likewise, since the object handle 328 and object classification number 332 in tuple 503 of table 206 match the object handle 328 and object classification number 332, respectively, in tuple 342, the object 26' in originating system 10' whose identification number 318 (as assigned by system 10') is associated with the handle 328 and classification number 332 in tuple 342, is considered by interface 78 to correspond or be equivalent to the object 26 in target system 10 (i.e., whose handle 328 and classification number 332 as assigned by system 10 are stated in tuple 503). Thus, objects 28 and 28' are determined by interface 78 to be equivalent or to correspond to each other, and objects 26 and 26' are determined by interface 78 to be equivalent or to correspond to each other. Thus, assuming that only objects that truly correspond or are equivalent to each other in the originating and target systems 10', 10 (i.e., that have substantially identical functions, configurations, and/or operations) are assigned identical respective logical handles and object classification numbers by the systems 10', 10, the interface 78 is able to determine based upon the information in table 206 and section 302 of script 300 which objects in systems 10' whose identification numbers (e.g., numbers 316, 318) are referenced by instructions 310, 312.

Using the information contained in the table 206, the interface 78 then modifies the image of script 300 stored in the user database 75 such that the instructions 310, 312 no longer reference the object identification numbers 316, 318 of the objects 28', 26' in the system 10', but instead, reference the object identification numbers 506, 508 of corresponding objects 28, 26 in system 10, respectively. The interface 78 then determines whether any instructions remain in the image of script 300 stored in database 75 that reference any object identification numbers of objects in system 10' for which corresponding objects do not exist in system 10. Such a condition can occur if, e.g., the total number of object identification numbers referenced in by instructions 308 exceeds the number of such object identification numbers changed by the interface 78 and/or if custom script functions (i.e., that include instructions that reference identification numbers of objects found only in the originating system 10') are in the script 300. If any such remaining instructions exist in the image of the script 300, the interface 78 may prompt the user 80 to supply object identification numbers of objects in system 10 to be substituted for the object identification numbers currently referenced in such instructions. The user prompts provided to the user 80 by the interface 78 may include lists of object identification number of objects in the system 10 that the interface 78 determines to be likely (e.g., based upon similarities in object logical handles and/or object classification numbers) to correspond to the objects whose remaining identification numbers are currently in the image of the script 300. The user 80 may then select from these lists, using the interface 78, desired object identification numbers of objects in the system 10 to be substituted for these remaining identification numbers. The interface 78 changes the remaining identification numbers referenced in the instructions 308 in the image of the script based upon these user selections. Additionally, the interface 78 may prompt the user 80 to modify names assigned to any custom functions in the image of the script 300 (e.g., to resolve any con flicts in custom function names between systems 10', 10), and may so modify such names in accordance with user inputs provided in response to such prompts.

After all of the references to object identification numbers in the instructions 308 in the image of the script 300 have been so modified by the interface 78, the interface 78 then further modifies the image of the script 300 by deleting therefrom the header section 302. The interface 78 then causes the database manager 52 to store the resulting modification 201 (symbolically shown in FIG. 5) of script 300 among the scripts 200 in database 54; modification 201 is executable by the routing engine 48 to control call routing in the system 10. Prior to causing the script 201 to be stored in the database 54, the interface 78 may permit the user 80 to review and/or edit the script 201 so as to ensure that script 201 is actually in a format suitable for execution by the routing engine 48, and accurately reflects the call routing instructions that the user 80 wishes to be executed.

Thus, it is evident that there has been provided inventive techniques for use in generating communication system control scripts that fully satisfy both the aims and objectives hereinbefore set forth. It will be appreciated that although specific embodiments and methods of use of the present invention have been disclosed, many modifications, alternatives and equivalents thereof will be apparent to those skilled in the art. For example, script 300 need not actually have been initially generated for execution by a physical originating communication system 10, but instead, may have been generated by a simulation system that comprises virtual or computer-simulated objects for providing simulated responses to a central controller in response to commands issued from the central controller. Alternatively, the script 300 may comprise sample or suggested "generic" scripts whose instructions reference object identification numbers of objects expected to be in an actual physical target communication system. Other modifications are also possible. Accordingly, the technique of the present invention should be viewed quite broadly, as encompassing all such modifications, alternatives and equivalents, and as being defined only as set forth in the hereinafter appended claims.

What is claimed is:

1. A computerized method for use in generating a call routing control script comprising instructions that, when executed by a communication system, control routing of a call in the system, the method comprising:

generating a first section in the call routing control script, the first section containing call routing instructions that reference object identification values that identify respective objects in the communication system, the objects comprising at least one of a physical and logical entity in the communication system, at least one instruction in the call routing script, when executed by the communication system, controlling the at least one entity; and generating in the call routing script a second section in which the values are each associated with a respective logical handle and with a respective object classification.

2. A method according to claim 1, further comprising, storing in the communication system a database that correlates respective object identification values with respective logical handles and with respective object classifications.

3. A method according to claim 1, wherein the entity comprises at least one of an agent workgroup, an agent system, an automatic call distributor, and an interactive voice response unit.

4. A computerized method for use in generating a first control script that may be executed by a first communication system to control the system, the method comprising:

accessing a first section in a second control script to locate instructions in the first section that reference object identification values that identify objects in a second communication system, the objects comprising at least one of a physical and logical entity in the second communication system that may be controlled by execution of at least one instruction in the first section;

accessing a second section in the second control script in which the values are each associated with a respective logical handle and with a respective object classification;

accessing a database that correlates respective object identification values of respective objects in the first communication system with respective logical handles and with respective object classifications of the respective objects in the first communication system;

locating in the second section, based upon information contained in the database and the second section, at least certain object identification values of objects in the second communication system that correspond to objects in the first communication system; and replacing in the second section the at least certain object identification values with respective object identification values of corresponding objects in the first communication system.

5. A method according to claim 4, wherein the entity comprises at least one of an agent workgroup, an agent system, an automatic call distributor, and an interactive voice response unit.

6. A method according to claim 4, further comprising, if a number of the at least certain object identification values is less than a total number of object identification values in the second section, prompting a user to supply additional object identification values.

7. A method according to claim 4, wherein the corresponding objects are determined based upon correspondences between the logical handles and object classifications of objects in the first and second communication systems.

8. An apparatus for use in generating a call routing control script comprising instructions that, when executed by a communication system, control routing of a call in the system, the apparatus comprising:

a first mechanism that generates a first section in the call routing control script, the first section containing call routing instructions that reference object identification values that identify respective objects in the communication system, the objects comprising at least one of a physical and logical entity in the communication system, at least one instruction in the call routing script, when executed by the communication system, controlling the at least one entity; and a second mechanism that generates in the call routing script a second section in which the values are each associated with a respective logical handle and with a respective object classification.

9. An apparatus according to claim 8, further comprising, a third mechanism that stores in the communication system a database that correlates respective object identification values with respective logical handles and with respective object classifications.

10. An apparatus according to claim 8, wherein the entity comprises at least one of an agent workgroup, an agent system, an automatic call distributor, and an interactive voice response unit.

11. An apparatus for use in generating a first control script that may be executed by a first communication system to control the system, the apparatus comprising:

a first mechanism that accesses a first section in a second control script to locate instructions in the first section that reference object identification values that identify objects in a second communication system, the objects comprising at least one of a physical and logical entity in the second communication system that may be controlled by execution of at least one instruction in the first section;

a second mechanism that accesses a second section in the second control script in which the values are each associated with a respective logical handle and with a respective object classification;

a third mechanism that accesses a database that correlates respective object identification values of respective objects in the first communication system with respective logical handles and with respective object classifications of the respective objects in the first communication system;

a fourth mechanism that locates in the second section, based upon information contained in the database and the second section, at least certain object identification values of objects in the second communication system that correspond to objects in the first communication system; and a fifth mechanism that replaces in the second section the at least certain object identification values with respective object identification values of corresponding objects in the first communication system.

12. An apparatus according to claim 11, wherein the entity comprises at least one of an agent workgroup, an agent system, an automatic call distributor, and an interactive voice response unit.

13. An apparatus according to claim 11, further comprising, a sixth mechanism that prompts if a number of the at least certain object identification values is less than a total number of object identification values in the second section, a user to supply additional object identification values.

14. An apparatus according to claim 11, wherein the corresponding objects are determined based upon correspondences between the logical handles and object classifications of objects in the first and second communication systems.

15. Computer-readable memory comprising computer-executable instructions for use in generating a call routing control script comprising other instructions that, when executed by a communication system, control routing of a call in the system, the computer-executable instructions when executed causing:

generation of a first section in the call routing control script, the first section containing call routing instructions that reference object identification values that identify respective objects in the communication system, the objects comprising at least one of a physical and logical entity in the communication system, at least one instruction in the call routing script, when executed by the communication system, controlling the at least one entity; and generation of, in the call routing script, a second section in which the values are each associated with a respective logical handle and with a respective object classification.

16. Memory according to claim 15, wherein the computer-executable instructions also cause storing in the communication system of a database that correlates respective object identification values with respective logical handles and with respective object classifications.

17. Memory according to claim 15, wherein the entity comprises at least one of an agent workgroup, an agent system, an automatic call distributor, and an interactive voice response unit.

18. Computer-readable memory comprising computer-executable instructions for use in generating a first control script that may be executed by a first communication system to control the system, the computer-executable instructions when executed causing:

accessing of a first section in a second control script to locate instructions in the first section that reference object identification values that identify objects in a second communication system, the objects comprising at least one of a physical and logical entity in the second communication system that may be controlled by execution of at least one instruction in the first section;

accessing of a second section in the second control script in which the values are each associated with a respective logical handle and with a respective object classification;

accessing of a database that correlates respective object identification values of respective objects in the first communication system with respective logical handles and with respective object classifications of the respective objects in the first communication system;

locating in the second section, based upon information contained in the database and the second section, of at least certain object identification values of objects in the second communication system that correspond to objects in the first communication system; and replacing in the second section of the at least certain object identification values with respective object identification values of corresponding objects in the first communication system.

19. Memory according to claim 18, wherein the entity comprises at least one of an agent workgroup, an agent system, an automatic call distributor, and an interactive voice response unit.

20. Memory according to claim 18, wherein the computer-executable instructions also cause, if a number of the at least certain object identification values is less than a total number of object identification values in the second section, prompting of a user to supply additional object identification values.

21. Memory according to claim 18, wherein the corresponding objects are determined based upon correspondences between the logical handles and object classifications of objects in the first and second communication systems.

22. An apparatus for use in generating a call routing control script comprising instructions that, when executed by a communication system, control routing of a call in the system, the apparatus comprising:

means for generating a first section in the call routing control script, the first section containing call routing instructions that reference object identification values that identify respective objects in the communication system, the objects comprising at least one of a physical and logical entity in the communication system, at least one instruction in the call routing script, when executed by the communication system, controlling the at least one entity; and means for generating in the call routing script a second section in which the values are each associated with a respective logical handle and with a respective object classification.

23. An apparatus according to claim 22, further comprising, means for storing in the communication system a database that correlates respective object identification values with respective logical handles and with respective object classifications.

24. An apparatus according to claim 22, wherein the entity comprises at least one of an agent workgroup, an agent system, an automatic call distributor, and an interactive voice response unit.

25. An apparatus for use in generating a first control script that may be executed by a first communication system to control the system, the apparatus comprising:

means for accessing a first section in a second control script to locate instructions in the first section that reference object identification values that identify objects in a second communication system, the objects comprising at least one of a physical and logical entity in the second communication system that may be controlled by execution of at least one instruction in the first section;

means for accessing a second section in the second call control script in which the values are each associated with a respective logical handle and with a respective object classification;

means for accessing a database that correlates respective object identification values of respective objects in the first communication system with respective logical handles and with respective object classifications of the respective objects in the first communication system;

means for locating in the second section, based upon information contained in the database and the second section, at least certain object identification values of objects in the second communication system that correspond to objects in the first communication system; and means for replacing in the second section the at least certain object identification values with respective object identification values of corresponding objects in the first communication system.

26. An apparatus according to claim 25, wherein the entity comprises at least one of an agent workgroup, an agent system, an automatic call distributor, and an interactive voice response unit.

27. An apparatus according to claim 25, further comprising, means for if a number of the at least certain object identification values is less than a total number of object identification values in the second section, prompting a user to supply additional object identification values.

28. An apparatus according to claim 25, wherein the corresponding objects are determined based upon correspondences between the logical handles and object classifications of objects in the first and second communication systems.

* * * * *